US006306340B1

United States Patent
Seifrit, Jr. et al.

(10) Patent No.: US 6,306,340 B1
(45) Date of Patent: Oct. 23, 2001

(54) METHOD OF MAKING A BRAKE ROTOR

(75) Inventors: David R. Seifrit, Jr., Rochester Hills; Maryanne R. Farkas, Northville, both of MI (US)

(73) Assignee: DaimlerChrysler Corporation, Auburn Hills, NJ (US)

( * ) Notice: Subject to any disclaimer, the term of this patent is extended or adjusted under 35 U.S.C. 154(b) by 0 days.

(21) Appl. No.: 09/425,452

(22) Filed: Oct. 22, 1999

(51) Int. Cl.$^7$ ...................................................... B22F 7/02
(52) U.S. Cl. .................................. 419/6; 419/5; 29/460; 29/521
(58) Field of Search .......................... 29/505, 521, 460; 188/218 XL; 419/5, 38, 6

(56) References Cited

U.S. PATENT DOCUMENTS

| | | | |
|---|---|---|---|
| 2,695,230 | * 11/1954 | Haller | 419/5 |
| 3,600,791 | * 8/1971 | Talmage | 419/5 |
| 3,866,303 | 2/1975 | Chehi . | |
| 3,891,398 | * 6/1975 | Odier | 428/565 |
| 3,940,268 | * 2/1976 | Catlin | 419/8 |
| 4,011,295 | * 3/1977 | Tree et al. | 264/275 |
| 4,094,709 | 6/1978 | Rozmus . | |
| 4,278,153 | 7/1981 | Venkatu . | |
| 4,503,009 | * 3/1985 | Asaka | 419/6 |
| 4,523,666 | * 6/1985 | Murray | 188/218 XL |
| 4,722,824 | * 2/1988 | Wiech, Jr. | 419/6 |
| 4,743,512 | * 5/1988 | Marlowe et al. | 428/552 |
| 5,183,632 | 2/1993 | Kiuchi et al. . | |
| 5,470,524 | * 11/1995 | Krueger et al. | 419/5 |
| 5,620,791 | 4/1997 | Dwivedi et al. . | |
| 5,678,164 | * 10/1997 | Berthelemy et al. | 419/5 |
| 5,765,667 | 6/1998 | Ross et al. . | |
| 5,903,815 | 5/1999 | Scott . | |
| 6,019,937 | * 2/2000 | Shivanath et al. | 419/14 |
| 6,033,788 | * 3/2000 | Cawley et al. | 428/548 |
| 6,105,234 | * 8/2000 | Kremsmair et al. | 29/521 |
| 6,117,205 | * 9/2000 | Krause et al. | 75/246 |
| 6,120,727 | * 9/2000 | Asaka et al. | 419/6 |

FOREIGN PATENT DOCUMENTS

08226477 * 9/1996 (JP) ................................ F16D/65/12

* cited by examiner

*Primary Examiner*—I Cuda-Rosenbaum
*Assistant Examiner*—Essama Omgba
(74) *Attorney, Agent, or Firm*—Mark P. Calcaterra

(57) ABSTRACT

A brake rotor for automotive vehicles can be manufactured by a process that involves designing the rotor as two separate sections, forming each rotor section as a separate powdered metal compact, assembling the metal compacts together in a final configuration, and sintering the assembly to densify and bond the rotor sections into a unitary brake rotor body.

3 Claims, 3 Drawing Sheets

METHOD OF MAKING A BRAKE ROTOR

BACKGROUND AND SUMMARY OF THE INVENTION

This invention relates to a method of making a brake rotor usable in automotive vehicles. The method utilizes powder metal technology to produce a brake rotor having improved performance characteristics.

Under current practice vehicle brake rotors are often manufactured as grey iron castings Considerable machining of the castings is required.

One problem with such castings is that the tolerances on brake rotor dimensions are so great that it may be difficult in certain instances to select a suitable reference surface to initiate the machining operations. A relatively great amount of machining may be required. Consistent parts uniformity may not be achieved, depending on the accuracy of the sand casting operation.

In many brake rotor constructions internal air cooling fan blades are provided for maintaining the rotor at a reasonably low operating temperature under adverse operating conditions. Typically, the brake rotor comprises two annular disks and an array of circumferentially spaced fan blades extending between the two disks. As the brake rotor rotates with the vehicle wheel the fan blades rotate around the wheel (rotor) axis, thereby producing an outwardly radiating air flow through the annular space between the two disks. The air flow acts as a coolant to maintain the brake rotor at a reasonably low temperature under adverse conditions (high ambient temperatures and frequent braking events).

When the brake rotor is manufactured out of a sand casting it is difficult to design the fan blades with an optimum air flow geometry. The sand cores for the air flow blades cannot be sufficiently thin because they would tend to sag or deform in the casting process, causing irregular fan blade geometry. Also, the fan blade surfaces tend to be rough, in accordance with the grain size of the core sand.

When a vehicle is driven on an infrequent basis conventional brake rotors can accumulate a thin coating of rust. When the vehicle is driven the rust coating can cause minor vibration in the brake pedal or steering wheel. This can be annoying to some drivers. Brake rotors produced by the present invention can be impregnated with a rust inhibitor that prevents rust build up on the rotor surfaces.

Another operational problem with conventional brake rotors is vibrational noise. Carbon particulates in the iron alloy used for the solid rotor tend to act as barriers against noise and vibrational waves traveling through the rotor. The carbon acts as a noise damping constituent in the iron alloy. Brake rotors made by the process of the present invention have a porous microstructure that tends to absorb vibrational waves without the need for a closely-controlled carbon content. The microstructure of the powdered metal part acts as a vibration dampener during normal vehicle operation.

The present invention relates to a method of making a brake rotor, wherein powder metallurgy is used to form the rotor in two disk-like sections; one section has external protuberances that define fan blades in the assembled rotor. The two disk-like sections are assembled together prior to sintering, so that the sintering operation densifies the sections, and also bonds the sections together.

The inventive method is advantageous in that green compacts produced by the powder compacting operation have greater dimensional accuracy and consistency than can be obtained with conventional sand castings. As a result, less machining of the sintered product is required to produce the final brake rotor structure.

A further advantage of the invention is that the porous microstructure of the powdered metal parts enables a rust inhibitor to be impregnated into the finished rotor, thereby eliminating rust problems associated with conventional brake rotor constructions.

An additional advantage of the present invention is that the tolerances on raw material chemistry can be less stringent. Conventional rotors made from grey iron casting content require close control on the carbon, since the carbon is used as a vibration absorption mechanism in the alloy. In the present invention the porous microstructure of the powdered metal part acts as a vibration dampening mechanism, so that close control on the carbon content is not required for vibration dampening purpose.

A further advantage of the present invention is that the internal fan blades within the brake rotor can be configured for good aerodynamic performance, since the fan blades are external protuberances formed on one of the brake rotor sections; the mold surfaces can be designed to form relatively thin aerodynamic blade elements on a consistent basis. In conventional sand casting operations it is not possible to use thin tapered core sections without sacrificing product quality control.

Further features and advantages of the invention will be apparent from the attached drawing and description of an apparatus that can be used in practice of the invention.

BRIEF DESCRIPTION OF THE DRAWING

FIG. 3 is taken prior to the operations of assembling and sintering the components.

DESCRIPTION OF THE EMBODIMENT OF THE INVENTION

Figure 1:
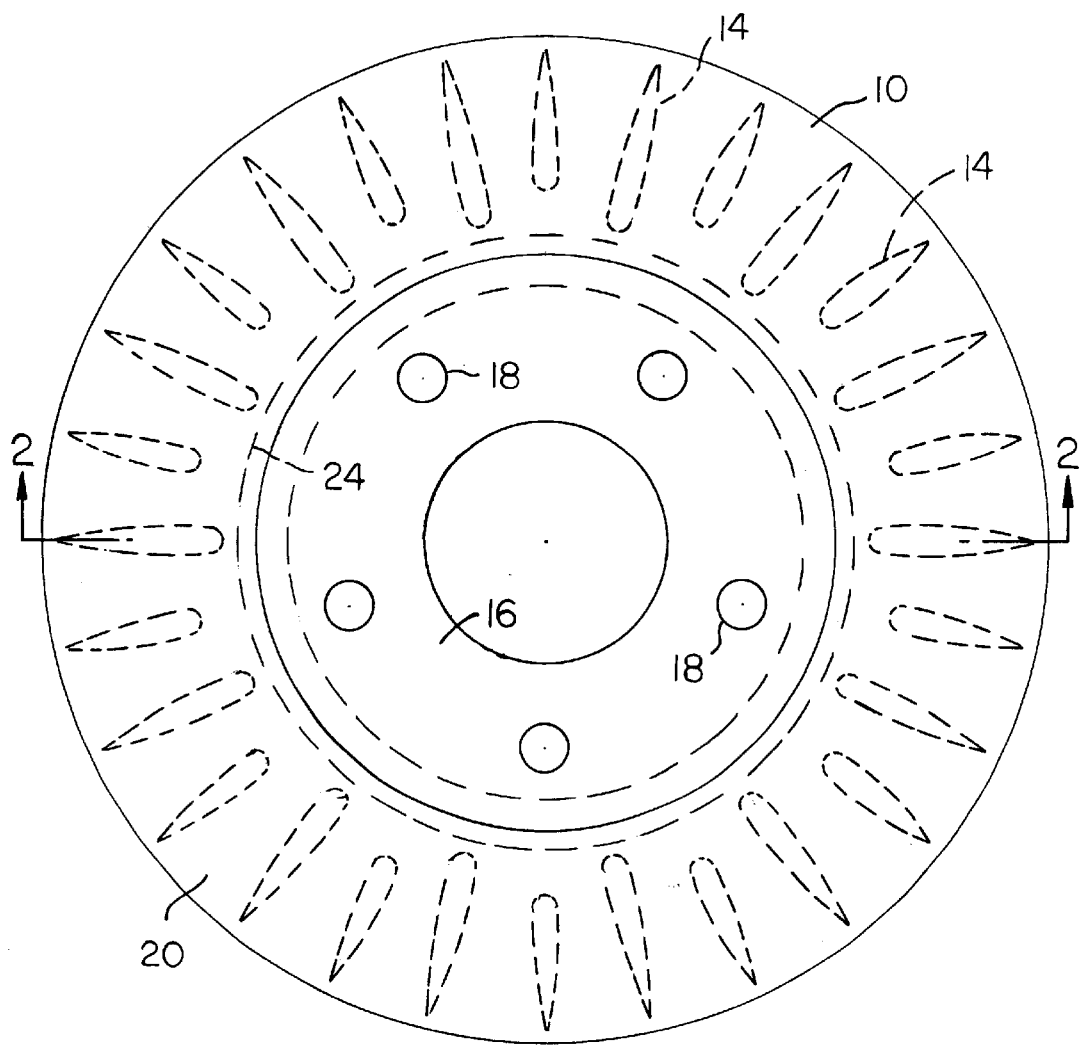
FIG. 1 is a plan view of a brake rotor made by the process of the present invention.
Figure 2:
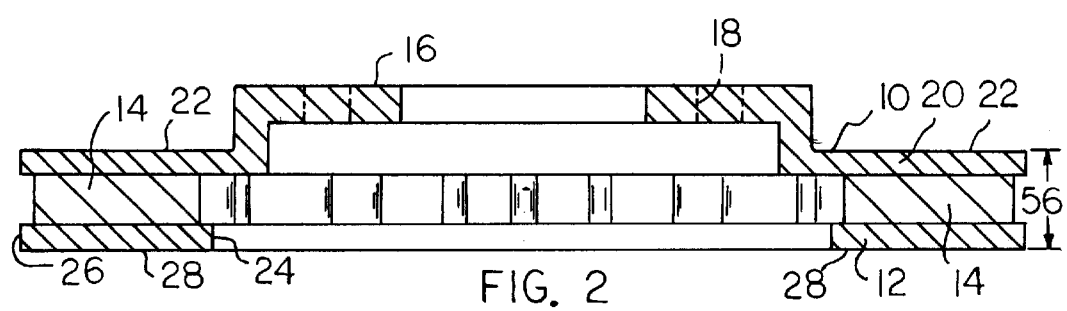
FIG. 2 is a sectional view taken on line 2—2 in FIG. 1

Referring to FIGS. 1 and 2, there is shown a vehicle brake rotor that can be made by the method of the present invention. As shown, the brake rotor includes a first circular disk 10, a second circular disk 12 and plural fan blades 14 connecting the two disks. As shown in FIG. 1, blades are circumferentially spaced around peripheral areas of the circular disks.

Disk 10 includes a central hub area 16 having five circular holes 18 that are used to fasten the brake rotor to a vehicle wheel hub (not shown). During operation of the vehicle, the brake rotor rotates with the vehicle ground wheel.

Disk 10 further includes an outer annular section 20 offset from hub area 16 so as to be properly spaced from the vehicle wheel for disposition relative to the brake caliper (not shown). Annular surface 22 of the disk is machined to a smooth flat condition. The other surfaces of the disk are not machined.

The second circular disk 12 is a flat annular disk having an inner edge 24 and an outer edge 26. Exposed surface 28 of the disk is machined to a smooth flat condition. The other surfaces of the disk are left in the as-formed unmachined state.

Fan blades 14 are preferably configured to have airfoil cross-sections, as shown in FIG. 1. While the brake rotor is rotating, blades 14 move atmospheric air radially outwardly from the central space within the brake rotor to the areas beyond the rotor outer edge. Airflow along the inner major faces of disks 10 and 12 cools the disk walls, thereby prolonging brake life under adverse operating conditions.

Figure 5:
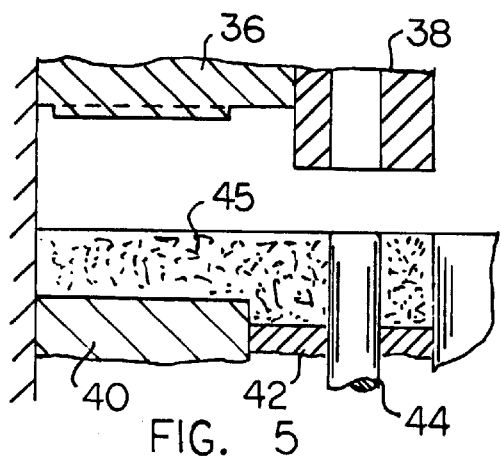
FIG. 5 is a fragmentary sectional view taken through a die system that can be used for compacting the metal powders to form a brake rotor component, under the present invention.
Figure 6:
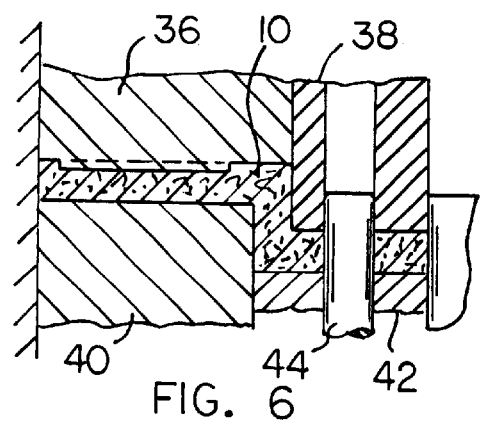
FIG. 6 is a view taken in the same direction as FIG. 5, but showing the die system in a closed condition.
Figure 7:
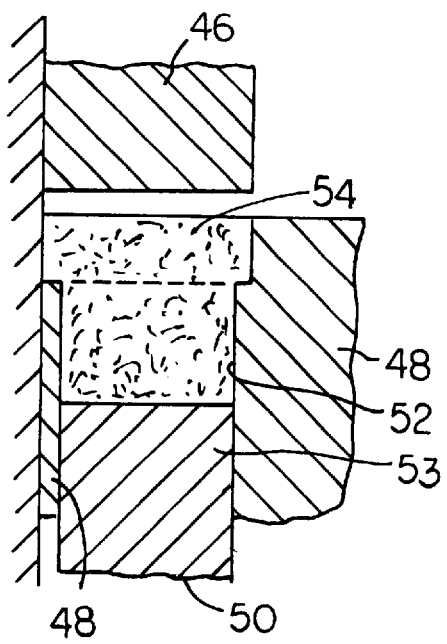
FIG. 7 is a fragmentary sectional view taken through a second die system that can be used to form a second brake rotor component, according to the invention.
Figure 8:
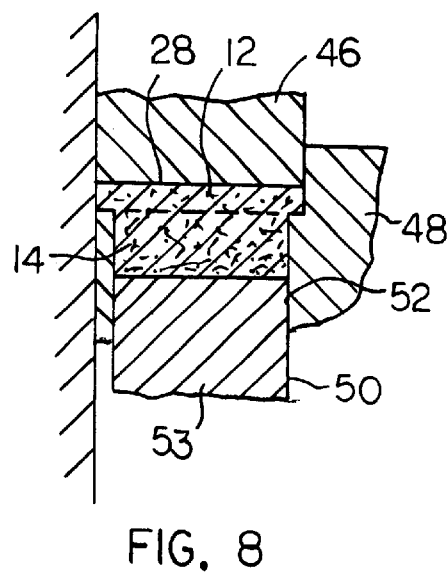
FIG. 8 is a view taken in the same direction as FIG. 7 but showing the die system in a closed condition.

The brake rotor of FIGS. 1 and 2 is manufactured out of two separate components that are individually formed by compressing contained metal powders with separate die systems. One such die system is depicted in FIGS. 5 and 6. A second die system is depicted in FIGS. 7 and 8. The two powdered metal compacts are assembled together and then subjected to a sintering operation in a non-oxidizing atmosphere. During the sintering operation the metal particles are recrystallized and bonded together to form a high strength brake rotor having the configuration depicted in FIGS. 1 and 2. The sintering operation causes fan blades 14 to bond to the interior surfaces of disk 10.

Figure 3:
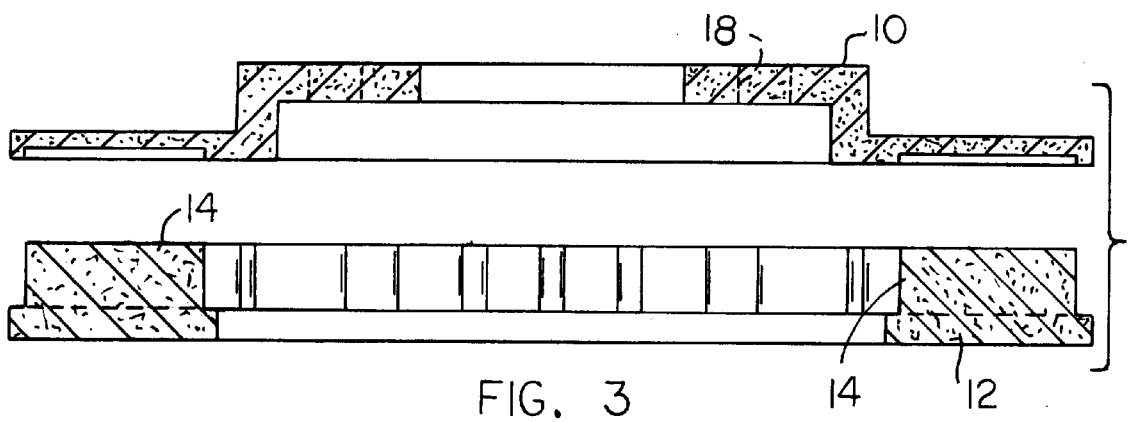
FIG. 3 is an exploded view of two components used to form the brake rotor shown in FIG. 1.
Figure 4:
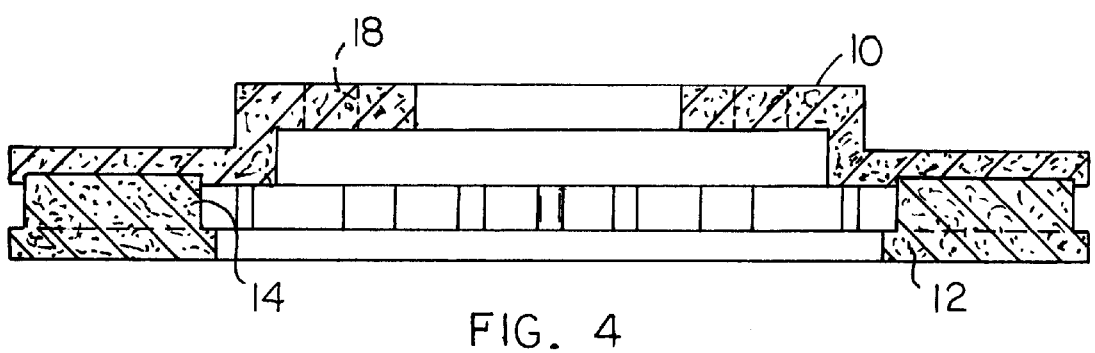
FIG. 4. Is view taken in the same direction as FIG. 3, but after the components (powder compacts) have been assembled together.
Figure 9:
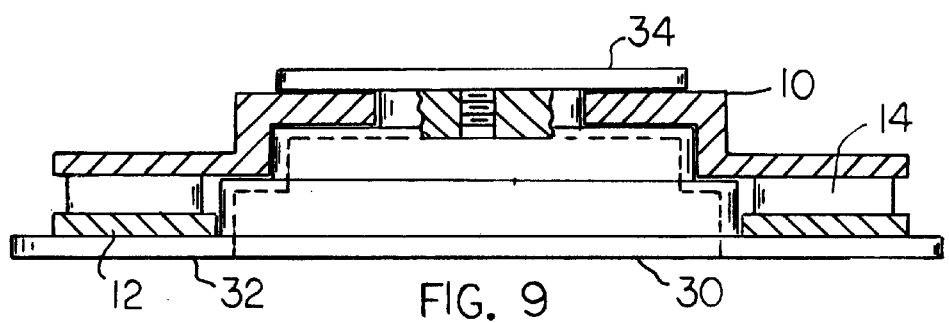
FIG. 9 shows a fixture that can be used to hold two brake rotor components in an assembled condition during a sintering operation.

As shown in FIG. 3, the disk 10 powdered metal compact forms one component of the brake rotor. The other brake rotor component is a separate powdered metal compact that includes disk 12 and fan blades 14. FIG. 4 shows the two components assembled together, prior to the sintering operation. During the sintering operation the two powdered metal compacts maybe held in the assembled condition by a fixture 30. As shown in FIG. 9, the fixture can include a stepped support member 32 adapted to underlie disk 12, and a cap member 34 adapted to be screwed onto member 32 so as to overlie disk 10. The fixture can take various different configurations, consistent with the general requirement for supporting the two powdered metal compacts in their assembled conditions while being conveyed (or placed) in the sintering furnace.

The die systems for forming the powdered metal compacts can take various configurations. As shown in FIGS. 5 and 6, the die system for the disk 10 powdered metal compact includes a two piece upper die assembly and a multi-piece lower die assembly.

The upper die assembly includes an outer annular die 36 and an inner annular die 38 movable separately by separate hydraulic ram power sources. The lower die assembly includes an outer annular die 40, an inner annular die 42 and multiple cylindrical punches 44. Punches 44 are used to form bolt holes 18 in the final disk 10. Dies 40 and 42 may be powered upwardly by separate hydraulic ram power sources. The powdered metal compact is formed in an upsidedown configuration (when FIG. 6 is compared with FIG. 3). Using multiple power sources for the dies can increase the total compaction force.

In FIG. 5 the metal powders are denoted by numeral 45. During operation of the die system the lower surfaces of the metal powders and the upper surfaces of such powders are subjected to separate compacting forces. The use of oppositely-directed compacting forces on the upper and lower surfaces of the contained powder produces a somewhat more densified powder compact than can be produced when only the upper surface of the powder is subjected to a compacting force.

During the compaction operation a pressure gradient can exist in the direction of the applied force, due to frictional resistance's between the powder particles. By compacting the powders in two directions a slightly more densified powder compact is achieved.

FIGS. 7 and 8 show a die system that can be used to form the powdered metal compact for disk 12 and blades 14. The die system includes an upper annular die 46 for forming disk surface 28, and a lower die 48 for forming the interior surface of disk 12. A third die mechanism 50 is slidable relative to lower die 48 for forming and compacting the fan blades 14. Guide openings 52, in lower die 48 are slidably mated to punches 53 that are included in die mechanism 50, whereby upward motion of die mechanism 50 compacts the powder areas that define fan blades 14.

In the die system depicted in FIGS. 7 and 8, upper die 46 and lower die mechanism 50 are separately powered so as to exert oppositely directed compaction forces on the contained powder mass 54.

After the two metal powder compacts have been separately formed, they are assembled together, as shown in FIG. 4. The assembled compacts are placed in fixture 30 as shown in FIG. 9, and moved through a sintering furnace for a predetermined time period, sufficient to form the unitary brake rotor depicted in FIGS. 1 and 2.

Disk surfaces 22 and 28 are machined to a smooth flat condition, such that the overall thickness dimension 56 of the rotor is within a predetermined tolerance, according to brake caliper clearance requirements. Thickness dimension 56 can be somewhat less than the corresponding thickness dimensions of conventional brake rotors because the airfoil fan blades 14 have greater aerodynamic efficiencies; blades 14 can have relatively small height dimensions because a given airflow can be achieved with a lesser blade height (lesser spacing between the two disks).

It was noted earlier that conventional brake rotors sometimes experience rust problems. When the brake rotor is made with powder metal technology, as herein proposed, the porous microstructure of the rotor body can be advantageously used to facilitate the impregnation of a rust inhibitor liquid into the rotor material (after the rotor has been machined to its final configuration).

In one contemplated procedure, the machined brake rotor can be placed in a closed chamber connectable to a vacuum source. After a vacuum condition has been established on the brake rotor surfaces (and within the minute pores of the sintered rotor body), a three way valve in the vacuum line can be operated to connect (switch) the closed chamber to a source of liquid rust inhibitor. The liquid is thereby drawn into the pores of the sintered rotor body. The technology heretofore used for oil impregnation of porous metal bearings can be employed to impregnate the brake rotor with a rust inhibitor liquid.

The primary feature of the invention involves the sectioning of a brake rotor into separate components, forming each component as a powdered metal compact, assembling the compacts together and sintering the assembly, whereby the separately-formed components are densified and bonded together as a unitary brake rotor structure. The unitary brake rotor bas performance advantages over conventional brake rotors formed as sand castings.

What is claimed:

1. A method of making a brake rotor, wherein said rotor comprises two annular disks and an array of circumferentially spaced fan blades interconnecting said disks; said method comprising;

(a) compacting a first mass of contained metal powders to form a first disk-shaped compact;

(b) compacting a second mass of contained metal powders to form a second compact having a configuration that includes an annular disk and plural airfoil cross-sectioned fan blades spaced around the disk circumference;

(c) assembling said first and second compacts together so that the fan blades are located between the two disks; and placing said first and second compacts in a fixture that prevents relative movement between the two disks, and (d) sintering the assembled compacts to form a unitary brake rotor.

2. The method of claim 1, and further comprising:

(e) impregnating the unitary brake rotor with a liquid rust inhibitor.

3. The method of claim 2, wherein step (e) comprises applying a vacuum to the brake rotor, and then introducing a liquid rust inhibitor to the vacuum atmosphere produced around the rotor.

* * * * *